United States Patent
Fang et al.

(10) Patent No.: US 9,967,843 B2
(45) Date of Patent: May 8, 2018

(54) USING MULTIPLE BEACON TYPES IN WIRELESS COMMUNICATION

(71) Applicant: ZTE Corporation, Shenzhen (CN)

(72) Inventors: Yonggang Fang, San Diego, CA (US); Bo Sun, Shenzhen (CN); Kaiying Lv, Shenzhen (CN); Weimin Xing, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 50 days.

(21) Appl. No.: 15/054,927

(22) Filed: Feb. 26, 2016

(65) Prior Publication Data

US 2016/0255570 A1  Sep. 1, 2016

(30) Foreign Application Priority Data

Feb. 27, 2015  (WO) ................ PCT/CN2015/073360

(51) Int. Cl.
*H04W 56/00* (2009.01)
*H04W 48/12* (2009.01)
*H04W 48/16* (2009.01)
*H04W 84/12* (2009.01)

(52) U.S. Cl.
CPC ......... *H04W 56/001* (2013.01); *H04W 48/12* (2013.01); *H04W 84/12* (2013.01)

(58) Field of Classification Search
CPC ... H04W 48/08; H04W 48/16; H04W 56/001; H04W 74/0825; H04W 84/12; H04W 74/0808; H04W 74/0816
See application file for complete search history.

(56) References Cited

U.S. PATENT DOCUMENTS

| | | | | |
|---|---|---|---|---|
| 2007/0002811 A1* | 1/2007 | Faccin | ................. | H04W 48/08 370/338 |
| 2007/0014269 A1* | 1/2007 | Sherman | ............... | H04W 48/12 370/338 |
| 2010/0135267 A1* | 6/2010 | Strutt | .................... | H04W 48/12 370/338 |
| 2013/0230035 A1* | 9/2013 | Grandhi | ............... | H04W 48/16 370/338 |
| 2013/0279381 A1* | 10/2013 | Sampath | ............... | H04W 48/08 370/311 |
| 2014/0010223 A1* | 1/2014 | Wang | ..................... | H04W 48/12 370/338 |
| 2014/0016478 A1* | 1/2014 | Koskela | ................ | H04W 48/16 370/241 |
| 2014/0233443 A1* | 8/2014 | Kumar | .................... | H04L 12/12 370/311 |

* cited by examiner

*Primary Examiner* — Scott M Sciacca
(74) *Attorney, Agent, or Firm* — Perkins Coie LLP

(57) ABSTRACT

A transmitting wireless device dynamically and periodically transmits beacon frames including either full set of information or a partial information about the BSS. The wireless device schedules the target beacon transmission time and target dynamic beacon transmission time to have different starting time and different interval for each BSS. A Nack based mechanism for detecting and report missing dynamic beacon frames is used to provide the wireless access point with a feedback information of dynamic beacon transmission for improving the transmission efficiency and reliability.

18 Claims, 12 Drawing Sheets

USING MULTIPLE BEACON TYPES IN WIRELESS COMMUNICATION

CROSS REFERENCE TO RELATED APPLICATIONS

This patent document claims the benefit of priority under 35 U.S.C. § 119(a) and the Paris Convention of International Patent Application No. PCT/CN2015/073360, filed on Feb. 27, 2015. The entire content of the before-mentioned patent application is incorporated by reference herein.

BACKGROUND

This patent document relates to wireless communications.

Wireless communication systems can include a network of one or more access points (AP) to communicate with one or more wireless stations (STA). An AP can emit radio signals that carry management information, control information or users' data to one or more wireless stations, and a station can also transmit radio signals to the access point in the same frequency channel via time division duplexing (TDD) or in a different frequency channel via frequency division duplexing (FDD).

IEEE 802.11 is an asynchronous time division duplexing technology for operation of a wireless local area network (WLAN). The basic unit of WLAN is a basic service set (BSS). An infrastructure BSS is the BSS with stations that communicate through associating with an Access Point (AP) to connect to the wired network or Internet. In a BSS, both access point and stations share the same frequency channel via using Carrier Sensing Multiple Access with Collision Avoidance (CSMA/CA) technology, a kind of TDD mechanism, for multiple access and data transmission.

SUMMARY

This patent document describes technologies for, among other things, a dynamic beacon transmission mechanism for improving spectrum efficiency and transmission reliability.

In one example aspect, a method of wireless communication is disclosed. The method includes dynamically transmitting, by a wireless communication device, beacon frames with different size, modulation scheme, transmit power, transmission interval and/or starting time. The dynamic beacon frame could be (a) a type-1 beacon frame which contains a complete set of information about the BSS, or (b) a type-2 beacon frame which includes partial information about the BSS.

In another example aspect, an apparatus for wireless communication is disclosed. The apparatus includes a memory that stores executable instructions, and a processor that reads the executable instructions from the memory to control one or more modules of the wireless communication apparatus to perform dynamic beacon transmissions over a wireless transmission medium. The dynamic beacon frame transmission includes (a) type-1 beacon frames which contain the complete set of information about the BSS, and (b) type-2 beacon frames which contain partial information about the BSS.

In yet another example aspect, a method of wireless communication is disclosed. The method includes scheduling the type-1 beacon transmission time, e.g., at the particular starting time and transmission interval; and scheduling the type-2 beacon transmission time, e.g., at particular starting time and transmission interval to avoid transmission collision with other frames in either BSS or OBSS.

In yet another example aspect, a method of wireless communication is disclosed. The method includes setting the appropriate transmission rate (MCS) and transmission power for the type-2 beacon frame to improve the transmission efficiency and balance the transmission reliability.

In yet another example aspect, a method of wireless communication is disclosed. The method includes carrying the type-2 beacon frame (MAC) over the high efficiency physical frame format to provide robustness of beacon transmission in large coverage deployment.

In yet another example aspect, a method of wireless communication is disclosed. The method includes detecting missing or collided beacon transmissions in OBSS deployment cases, providing detection result to the transmitting access point, and adjusting the future type-2 beacon transmissions to reduce the probability of missing or collided beacon frames and improve the transmission reliability.

In yet another example aspect, a method of wireless communication, implemented at a network-side wireless device, includes transmitting beacon signals that identify the wireless network and provide information for other wireless devices to associate or synchronize with the wireless network, wherein the beacon signals comprise at least two different beacon transmission types having different frame formats, transmissions of which are intermingled with each other, and wherein the first type of beacon transmissions comprise information about the wireless network that is not included in the second type of beacon transmissions.

In yet another example aspect, a method of operating a wireless device includes receiving a first type of beacon transmission, associating with a wireless network using information received from the first type of beacon transmission, receiving, after associating with the wireless network, a second type of beacon transmission, and maintaining time synchronization with the wireless network based on information obtained from the second type of beacon transmission.

Details of the above aspects and their implementations, and other features, are set forth in the accompanying drawings, the description and the claims.

DETAILED DESCRIPTION

This document describes techniques, mechanisms, devices, and systems for improving the efficiency and reliability of beacon frame transmissions in the BSS and overlapping BSS (OBSS) in indoor and/or outdoor deployment scenarios for contention based wireless communications.

In one aspect, a dynamic beacon transmission mechanism is provided for an access point to separate the beacon frame transmissions into type-1 beacon frame and type-2 beacon frame transmissions so that the access network could be optimized for spectrum efficiency while balancing the access delay.

In another aspect, a method in the dynamic beacon transmission is provided to carry a complete set of information about the BSS in the type-1 beacon frame and reduced set of information about the BSS in the type-2 beacon frame so as to reduce the type-2 beacon frame size and transmission time.

In yet another aspect, a method in the dynamic beacon transmission is provided to use an appropriate MCS rate for type-2 beacon content transmission so that the transmission time of type-2 beacon frame would be further reduced.

In yet another aspect, a method of the dynamic beacon transmission is provided to configure the beacon transmission interval and starting time to avoid collision with other beacon frame transmissions in OBSS deployment.

In another aspect, a method of missing or collided beacon frame detection and Nack based feedback of dynamic beacon transmission is provided for the station to detect the missing or collided type-2 beacon frame; and for the access point to control the following type-2 beacon transmission according to the reported Nack information by stations in BSS.

Section headings are used in the present document only for lucidity, and do not in any way limit the scope of the disclosed technology.

In IEEE 802.11, the basic service set (BSS) is the building block of a Wireless Local Area Network (WLAN). Wireless stations (also called stations) associated in the radio coverage area establish a BSS and provide basic service of WLAN.

Figure 1:
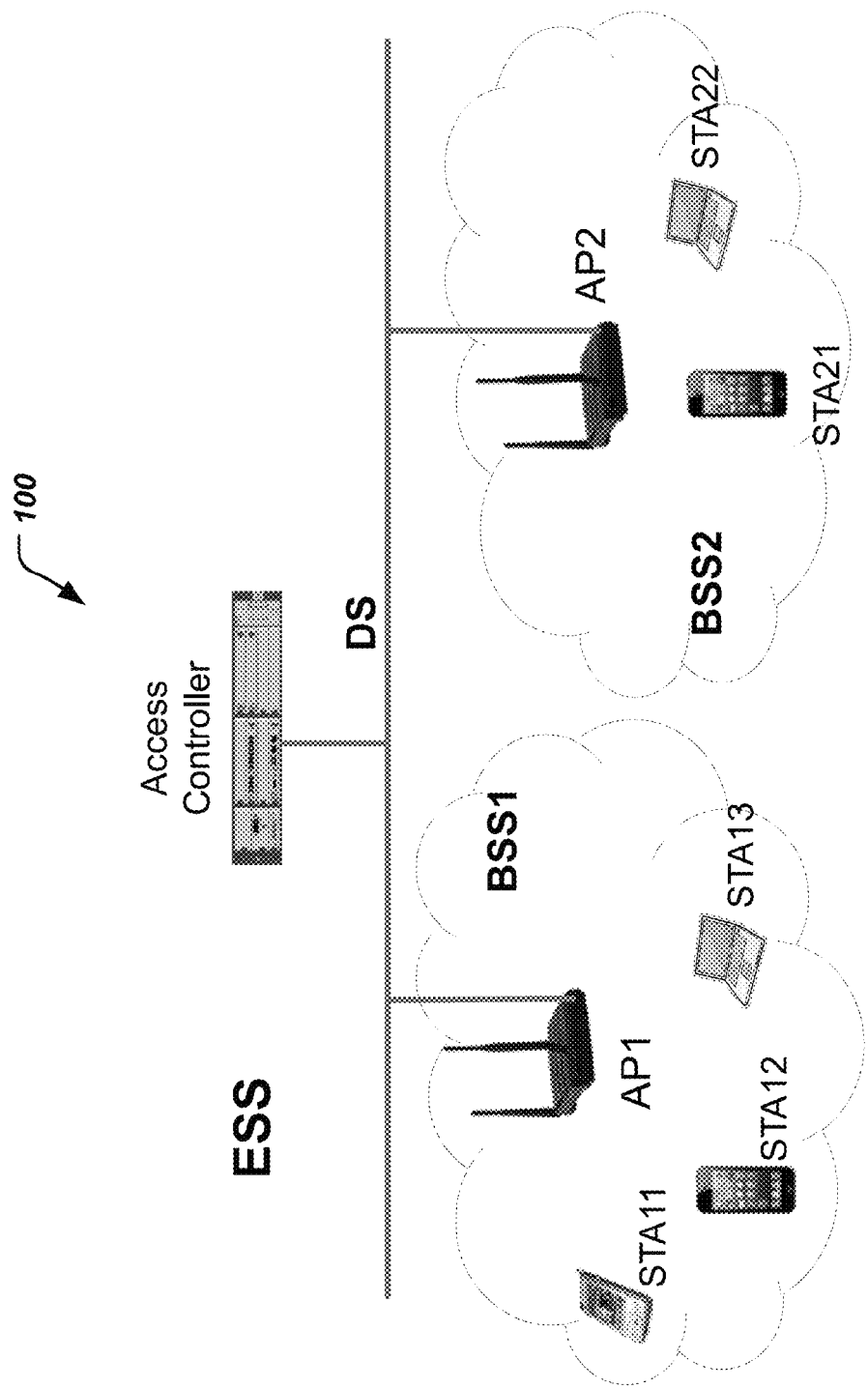
FIG. 1 shows an example of infrastructure BSS in a wireless communication system.

FIG. 1 illustrates an example of a wireless communication system 100. BSS1 and BSS2 are infrastructure BSSes. BSS1 contains one access point (AP1) and several non-AP stations, STA11, STA12, and STA13. The AP1 maintains associations with, e.g., maintains a wireless connectivity or reserves wireless communication resources for, stations STA11, STA12, and STA13. BSS2 contains one access point (AP2) and two non-AP stations, STA21 and STA22. The AP2 maintains associations with stations STA21 and STA22. Infrastructure BSS1 and BSS2 may be interconnected via the AP1 and AP2 or connected to a switch/gateway through a distribution system (DS). In 802.11 terminology, a central station being associated with other stations and performing management of the BSS is referred to an Access Point (AP). A BSS built around an AP is called an infrastructure BSS. Two or more BSSes could be interconnected via DS and form as Enhanced Service Set (ESS). An ESS may be managed and controlled by an access controller (AC).

IEEE 802.11 is a TDM based asynchronous technology. The AP, however, does not allocate dedicated time slots for the transmissions between AP and STAs. All the transmissions no matter management frames, control signaling or data frames have to go through medium contention prior to sending their transmissions.

In 802.11, certain type of frames are given access priority by which these frames can be transmitted with typically less wait time, during the medium contention process. The current 802.11 specification defines two types of signaling frames associated with different access priorities: management frames and control frames.

A beacon frame is a type of management frame which is used to indicate the presence of BSS. A beacon frame carries information about the BSS to facilitate operation of the BSS. This information may include one or more of time information, service set identification (SSID), capability, enhanced distributed channel access (EDCA) parameters, etc. for STAs to identify the BSS and perform association with the BSS. A beacon frame may include a fixed information fields (Timestamp, Beacon Interval and Capacity) and a variable number and size of information elements (IEs). The operational details of which IEs are included in a beacon frame depend on the configuration of BSS. Some AP may transmit only a few IEs while others may transmit a lot of IEs in beacon frame. Typically a bacon frame carries a few hundred bytes information about the BSS.

In a typical deployment case, the AP of BSS broadcasts a beacon frame periodically, e.g., every 100 ms, using the most reliable modulation and coding scheme (MCS) rate so that even STAs at cell coverage edge would be able to receive beacon signals. But such beacon transmission arrangement might cause some issues especially in the high dense overlapping deployment.

Beacon Frame Transmission Efficiency Issue:

An AP is often configured to transmit a beacon frame every 100 ms to avoid the long initial delay for stations to access the BSS. When an AP of BSS broadcasts a beacon frame using the lowest MCS rate, e.g., a rate at which transmissions will take a maximum amount of time to transmit the same number of bits, periodically, a beacon transmission would take about 1 ms per every 100 ms, which is about 1% air time of total transmission.

In ESS, especially managed WLANs in high dense deployment, many APs could be overlapped in the same coverage. In this deployment, each AP may broadcast its beacon frame to indicate its presence and provide the information of its BSS. If there were 10 APs in the overlapping area, each AP of OBSS needs to distribute its beacon transmission time in different slot to avoid transmission collision. Therefore about 10% of air time would be used just for beacon frame transmissions.

In such cases, most of information in beacon frames transmitted by APs in ESS is similar and duplicative. This information may include frequency information, SSID, supported rate, etc. Therefore a high percent of transmitted information in beacon frames in ESS is duplicative. This would cause the air time waste. The more frequent beacon transmissions, the more waste on the medium usage.

Beacon Frame Reliability Issue:

In addition to the possible reduction in medium usage efficiency, a beacon frame transmitted in overlapped BSS (OBSS) could have transmission reliability issue due to collisions. As WLAN is an asynchronous TDM system, only one transmission would be allowed at any given time. According to the IEEE802.11n specification, the beacon frame is assigned a higher priority and can be transmitted in PIFS (point coordination function, interframe space) time after sensing the medium idle. By keeping the PIFS time lower than wait time for other lower priority transmissions, beacon frames can be transmitted ahead of other transmissions. In OBSS case, however, if multiple APs transmit their beacon frames at same time, those beacon frames might be collided over the air.

To avoid a situation where multiple beacon frame transmissions overlap in time and collide with each other at same time in OBSS case, each AP could listen to other beacon transmission during the initialization time and adjust its starting time of beacon transmission at the time that is not allocated by other APs for beacon transmissions. However, in some deployment cases, an AP may not always be able to hear the transmission from other adjacent APs.

Figure 2:
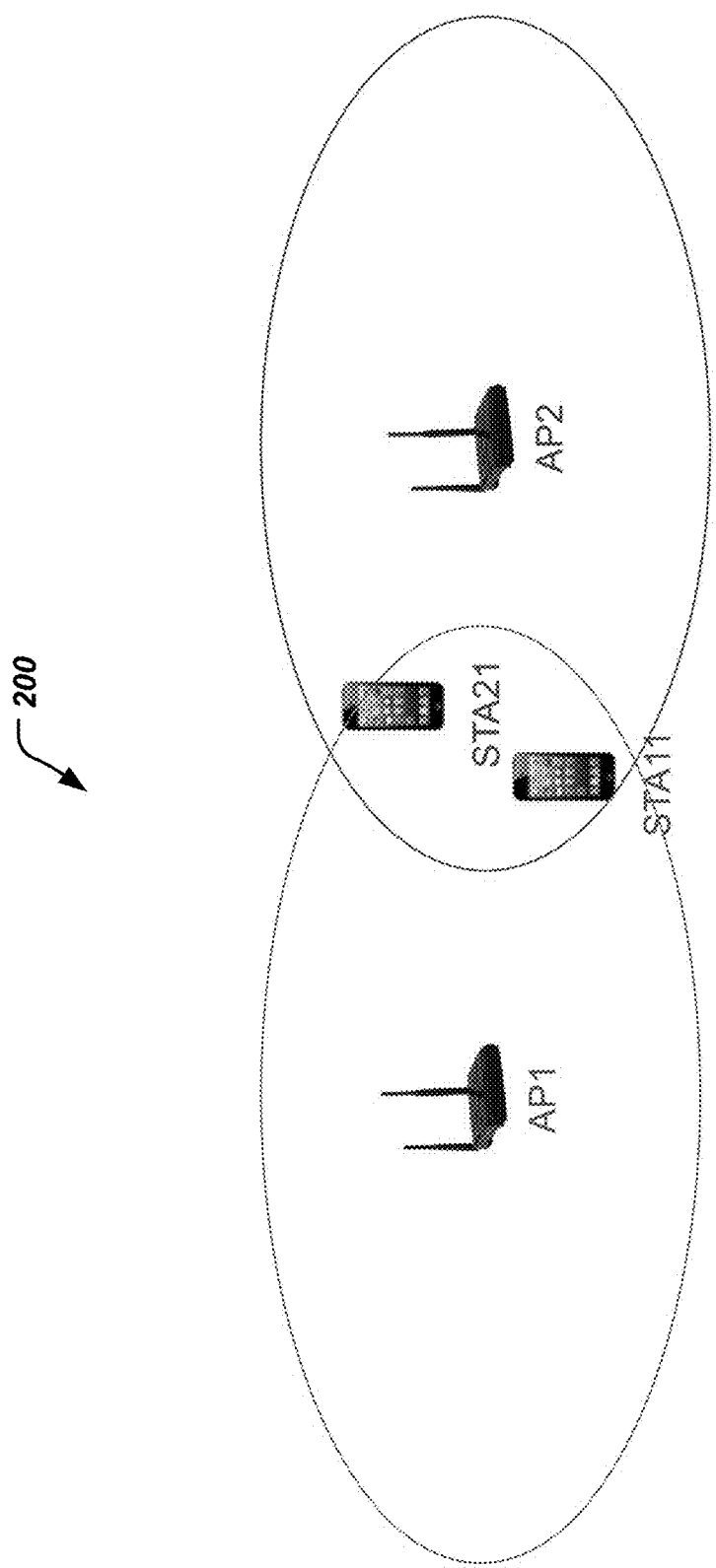
FIG. 2 shows an example of OBB deployment scenario in IEEE 802.11.

FIG. 2 shows an example of OBSS 200, which two Aps having overlapping coverage areas may not be able to hear transmissions from each other so that it would not know whether its beacon transmission time would be the same or closed to the transmission time of other beacon frames. In this case, the Aps themselves would not be able to detect beacon frame collisions.

In IEEE802.11ae, an EDCA based backoff mechanism is introduced for management frame transmissions. Per this mechanism, a beacon frame is suggested to use the default access category AC-VO of EDCA mechanism to contend the medium so that the beacon transmission would avoid some collision during the medium contention.

However the access category AC-VO is not only used by the beacon, but also used for voice data frame, and other management frames such as (Re)Association Request/Response; De-association, Probe Request (for individually addressed), ATIM, QoS, Authentication/De-authentication and etc. In high dense deployment of isolated BSS, those types of frames from multiple STAs may compete the medium using the same access category (AC-VO) and cause the beacon frame not to be sent out at scheduled time. In OBSS case, the beacon transmission does not only compete the transmissions with the same access category (AC-VO) from the same BSS, but also compete with those frames of AC-VO category and beacon frames from other BSSes. Even the beacon frame could be sent out over the air, the beacon frame may not be decoded correctly by STAs due to interference and/or collision with other frames.

Even worse, since the transmitting AP would not be aware of beacon transmission collided with other transmissions, it would be very difficult for the AP to adjust the beacon frame transmission time to avoid the collision in the future transmission. When a consecutive beacon frames are detected as lost, the associated STAs might start the re-association procedure with the AP. If those STAs could re-detect a beacon frame from either previous associated BSS or other adjacent OBSS, they might send the association request message to start re-association procedure at same time. This may cause a signal storm in the BSS due to unreliable beacon signals.

When STAs are not able to detect valid beacon frames for a while, the STAs may transmit a probe request frame using broadcast modulation way, e.g., using a time-inefficient modulation, to get connectivity assistance from adjacent BSSes. The AP that receives the probe request will respond the probe request in a given period to provide the information about its BSS. When multiple APs in the dense deployment respond the probe request, this may result in an increasing number of management transmissions with low modulation efficiency, causing a signal storm and potentially causing the user data bandwidth of the entire network to reduce to an unworkably low value.

In outdoor deployment cases, the reliable receiving area, e.g., cell size, is determined by many factors such as the Cyclic Prefix (or Guard Interval) length of the OFDM symbol and timing accuracy of timing synchronization between the access point and the station. The less the timing accuracy in synchronization, the less the multi-path tolerance in the radio environment, which causes less reliable receiving area. On the other hand, higher accuracy timing synchronization might increase the implementation costs.

The CP is used to protect the multi-path interference at the receiver and provide a certain level of tolerance for such interference in the OFDM technologies. The longer CP would provide a larger variance of multi-path tolerance especially outdoor deployment scenario. However, the fixed CP length specified in the current IEEE 802.11 specification is relative small which limits the WLAN cell size in outdoor deployment.

The beacon transmission techniques described herein, e.g., dynamic beacon transmission, can be used to, among other benefits, address issues discuss above in current beacon transmissions schemes.

In some embodiments, the dynamic beacon transmission mechanism may divide beacon transmissions into two types: type-1 beacon frame and type-2 beacon frame transmissions. As described herein, beacon frames of different types may be transmitted at different times that are relatively independent of each other but may depend on other operational scenarios as described herein.

Figure 3:
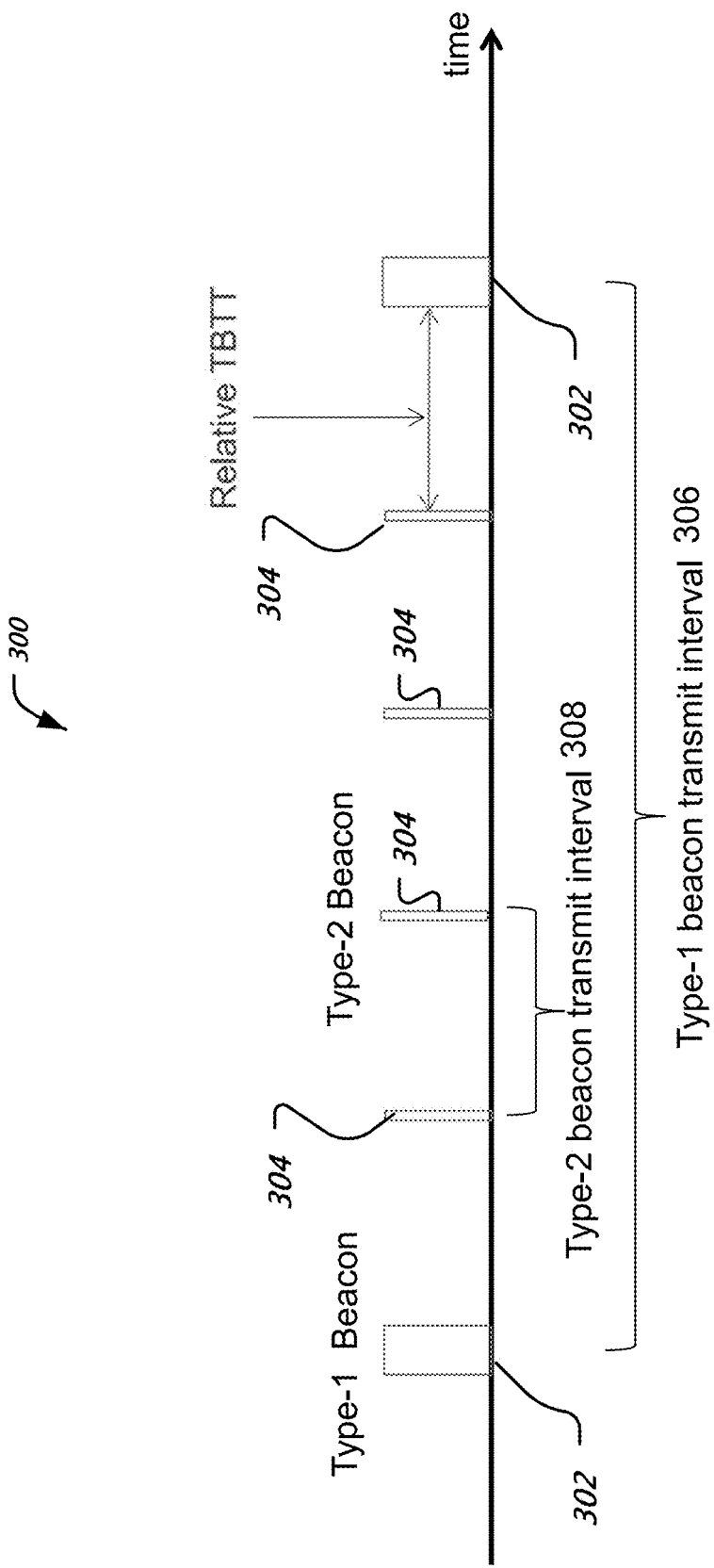
FIG. 3 shows an example of dynamic beacon transmission mechanism.

FIG. 3 shows an example timeline 300 of the dynamic beacon transmission mechanism. Example time instances at which the two different types of beacons can be transmitted are plotted along a horizontal timeline. The two beacon frame types may be distinguishable from each other as follows.

(A) type-1 beacon frame (302): This type of beacon transmission may carry a complete set of BSS information and may be transmitted periodically in type-1 beacon transmit interval 306 which might be a longer period than the type-2 beacon interval 308. For example, in some embodiments, the type-2 beacon interval may be 100 ms while the type-1 beacon interval may be 500 ms. The type-1 beacon frame may be used to provide a complete set of information about the BSS for STAs to perform network selection, association and other services.

(B) type-2 beacon frame (304): is transmitted with periodicity of shorter time interval (such as 100 ms), and may contain an abbreviated or limited information about the BSS. The type-2 beacon frame may be used to provide the timing and/or polling information for associated STAs to perform synchronization or receive data from the AP. In addition, the type-2 beacon frame could contain a minimum amount of information about the BSS in which the frame is being transmitted, for STAs to perform network selection and/or association with the AP. The become frames 302 and 304 have been drawn in FIG. 3 with different widths to reflect that the amount of transmission time for a type-1 beacon frame may be greater than that for a type-2 beacon frame.

The dynamic beacon transmission mechanism could improve the medium efficiency in two aspects:

(A) reducing beacon transmission time by removing IEs that do not change at all or do not change as often as the period of a type-2 beacon frame transmission, thereby reducing the time on medium for a beacon transmission.

(B) using higher MCS to further reduce the beacon transmission time of at least some beacons (e.g., type-2 beacons). As the AP could know the receiving condition of associated STAs, AP can determine the appropriate MCS rate and/or TX power for the type-2 beacon transmission, which is generally intended for reception by STAs that are already associated with the AP. In addition, the type-2 beacon could be carried over the high efficiency PHY format to provide more efficiency and reliable delivery.

In a synchronized ESS where APs are synchronized to a single timing reference and controlled by the Access Controller (AC), a type-1 beacon frame could be scheduled and transmitted by all Aps using in the most reliable MCS at the same time. In order to further improve the reliability of beacon frame transmission, an AP may boost its transmit power for beacon frame transmission.

In an asynchronous ESS in which some of the APs are not synchronized with each other and can transmit independently and in an un-synchronized manner, it is beneficial for different APs to distribute their type-1 beacon transmissions to occur at different time to avoid collisions with each other's transmissions. Each AP in the asynchronous ESS also has to contend the medium first and then transmit the beacon frame when the medium is acquired.

In one example configuration, e.g., as depicted in FIG. 3, multiple type-2 beacon transmissions, also called dynamic beacon (DB) frames, could be transmitted between two consecutive type-1 beacon transmissions.

A type-2 beacon may be transmitted by the AP periodically for STAs to easily detect its presence and perform timing synchronization with the AP. The type-2 beacon transmission period may be configurable, and/or coordinated by the Access Controller (AC) of an ESS. The AC or AP can determine the type-2 beacon transmission period based on the condition of air interface traffic of MyBSS (the BSS being controlled by the AP) and OBSS. If the traffic on the air medium is heavily loaded, e.g., above a pre-determined threshold, which may be a percent of available bandwidth, the AC or AP could increase the period of type-2 beacon transmissions and leave more airtime for user traffic.

In an OBSS configuration, each AP may start to transmit its type-2 beacon frame at a different time. The initial transmission time of type-2 beacon may be selected at the randomized time between two consecutive type-1 beacon frames from the AP, or can be coordinated and scheduled by the AC to avoid collision with other type-2 beacon frames in ESS.

A type-2 beacon frame may be used to provide time-varying information about BSS. The type-2 beacon frame may also include a timing reference for associated STAs. In addition a type-2 beacon could provide necessary information about BSS for STAs to perform association. In order for legacy stations to recognize the transmissions, the type-2 beacon frame may use the same frame format as legacy beacon, e.g., beacon transmissions as specified by IEEE 802.11, to provide backward compatibility, but it typically contains fewer Information Elements (IEs) than the type-1 beacon frame that is also transmitted in the BSS, thus improving medium usage efficiency.

Figure 4:
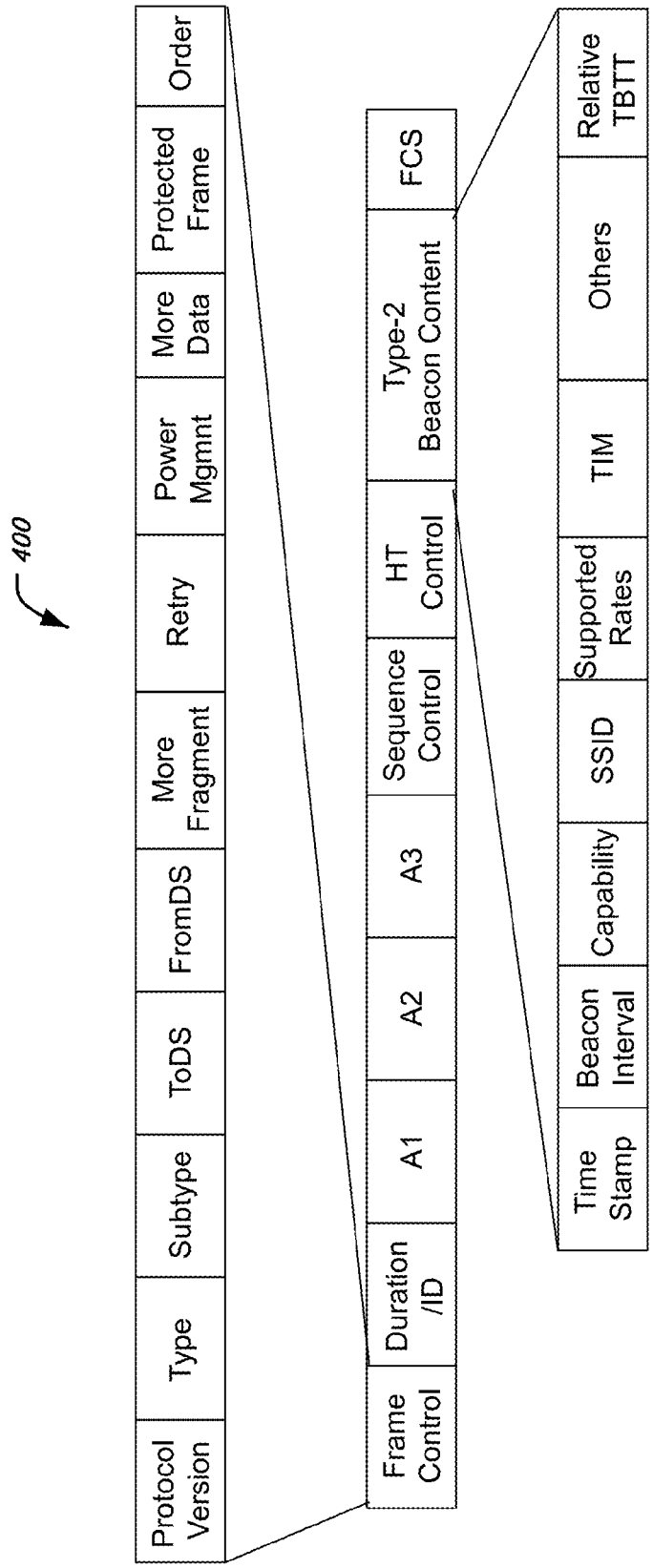
FIG. 4 shows an example of type-2 beacon frame format.

FIG. 4 shows an example of format of a type-2 beacon frame 400.

The type-2 beacon (MAC) frame could keep the same format as management frames of legacy 802.11 system and may contain fields such as Frame Control Field, Duration Field, Address Fields. The type-2 beacon frame body may include the following fields:

(A) Fixed parameters:

Timestamp: used to provide timing information for receiving station to align its local clock with that of the AP.

Beacon Interval: indicates the time interval between two consecutive target dynamic type-2 beacon transmission time (TDBTT). In order to avoid consecutive collision of type-2 beacon frames in OBSS, the type-2 beacon transmission period of a BSS may be set to different value from other BSS.

Capability: used to provide stations the capability information about the BSS.

(B) Selected IEs such as:

SSID: used for stations to identify the BSS and its presence.

Supported rates: used to provide stations the supported transmission rates information.

Channel bandwidth: used to indicate the supported channel bandwidth.

TIM: the traffic indication map is used to indicate the buffered data for sleeping associated stations.

Relative TBTT (RTBTT): is defined as the time from current type-2 beacon time to the target type-1 beacon transmission time (TBTT) in the time unit (TU). The value of this field may be changed in every type-2 beacon frame. RTBTT is used to assist stations to find the type-1 frame transmission time quickly. However, it can be discarded if it is received but not recognized by a legacy station.

In order to improve the reliability of current beacon frame transmission, in some embodiments, a Nack based feedback scheme can be used for the dynamic beacon transmission so that the transmitting AP could know immediately when a beacon frame is not successfully decoded by STAs. In some embodiments, no Nack may be used for type-1 beacon transmissions, but a Nack may be used for type-2 beacon transmissions.

The Nack based acknowledgement mechanism for type-2 beacon transmission can be enabled by the AP. When the dynamic beacon transmission including the Nack based acknowledgement mechanism is supported in BSS, the AP shall transmit an indication in the type-1 beacon frame. Therefore the DBEnabled AP can use the Nack based feedback information for improving reliability of type-2 beacon transmissions.

Figure 5:
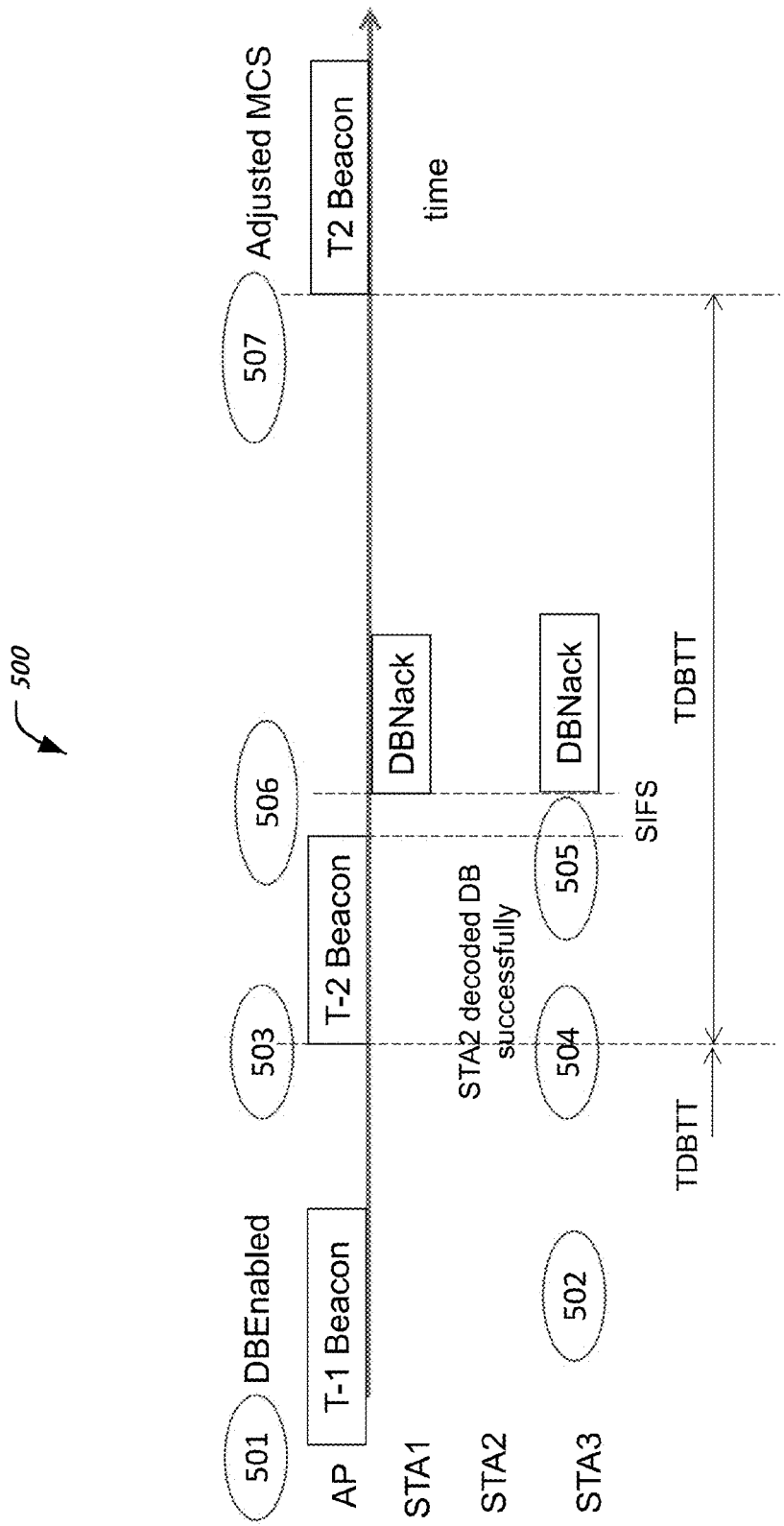
FIG. 5 shows an example of Nack based type-2 beacon frame feedback.

FIG. 5 shows an example of method 500 of Nack based acknowledgement for type-2 beacon transmissions along a timeline.

501. The DBEnabled AP, e.g., an AP that is currently using type-2 beacon transmissions, transmits the type-1 beacon frame with setting DBEnabled=1.

502. When a DBCapable station, e.g., a station that is able to receive the type-2 beacon transmissions and extract and use the information contained therein, receives the type-1 frame with DBEnabled=1, it would enable the type-2 beacon detection acknowledgement mechanism during receiving the type-2 beacon frame to assist AP to adjust type-2 beacon transmissions. If a legacy STA receives a type-1 beacon with DBEnabled=1, it would discard this field and process other fields in the type-1 beacon frame using the normal (legacy) procedure.

503. The DBEnabled AP broadcasts a type-2 beacon frame at TDBTT using the QBPSK/BPSK modulation for the preamble transmission and using appropriate MCS rate for type-2 beacon PSDU transmission.

504. According to TDBTT indicated in the type-1 beacon frame, a STA will detect a type-2 beacon frame at TDBTT.

505. If a DBCapable STA could not detect the type-2 beacon frame at TDBTT time or could detect the preamble of type-2 beacon frame but could not decode type-2 beacon PSDU successfully, it may send a DBNack frame to the AP in SIFS time when the missing detection number reaches a certain threshold. The DBNack frame could use a null data packet (NDP) format and with fixed values:

A1=DA=RA=BSSID, A2=SA=TA=BSSID.

Therefore DBNack from different STAs would have identical waveform for the BSS.

If the DBCapable STA decodes the type-2 beacon frame correctly, it follows the normal or legacy procedure for beacon frame process, and does not need to transmit any acknowledgement to the AP.

506. After broadcasting a type-2 beacon frame, the DBEnabled AP checks whether there is a DBNack frame in SIFS time. Since the DBNack has the identical waveform, the DBEnabled AP should be able to receive DBNack frame(s) correctly when they are sent from one or more STAs.

507. If the DBEnabled AP receives one or more DBNack frame reports from one or multiple STAs within a certain time, it takes appropriate actions for the following type-2 beacon frame transmission. The action may be a combination of one or more of the following:

(A) reducing the MCS rate for type-2 PSDU transmission,
(B) increasing the transmit power of type-2 beacon frame, and
(C) adjusting the starting time of type-2 or TDBTT.

Figure 6:
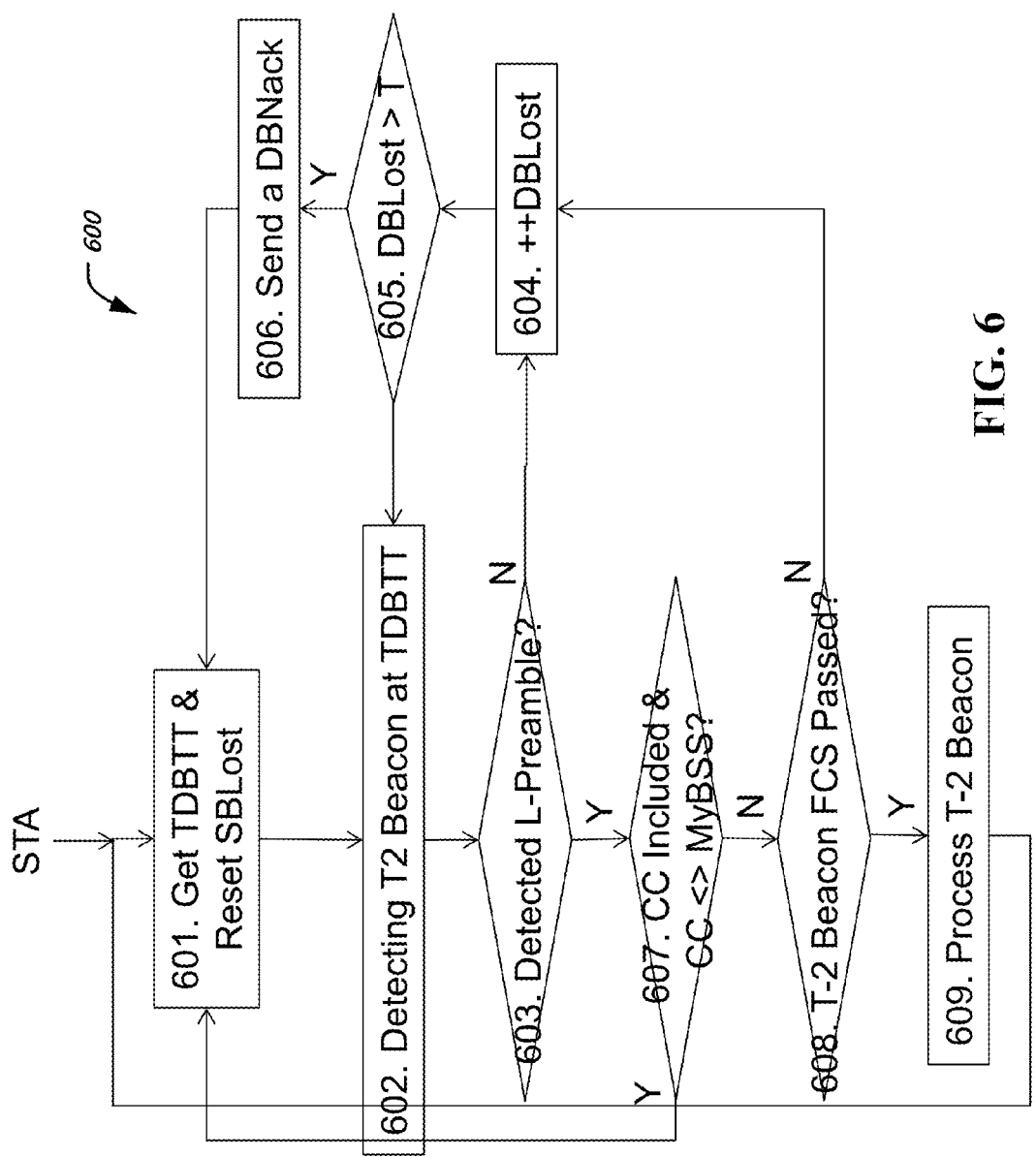
FIG. 6 shows an example of missing type-2 beacon frame detection procedure.

FIG. 6 shows an example of type-2 beacon frame detection and DBNack transmission procedure performed by a DBCapable STA.

601. A STA receives a TDBTT information from a type-1 beacon transmitted by the AP and reset the counter of DBLost=0.

602. The STA starts detecting a type-2 beacon frame at TDBTT time.

603. If the STA detects a legacy preamble of type-2 beacon frame, then it goes to the step 607.

604. Otherwise, the STA will increase the counter of DBLost.

605. If the DBLost is less than or equal to the given threshold T, the STA will continue detecting a type-2 beacon frame and at next TDBTT time 606. Otherwise if the DBLost is greater than the given threshold T, the STA will send a DBNack to the AP.

607. If the STA detects the preamble of type-2 beacon frame correctly, it will check whether BSS Color Code (CC) is included and CC is equal to MyBSS. If the BSS CC is included but not equal to MyBSS, the STA will continue sensing the medium and detect a beacon transmission.

608. Otherwise, the STA will continue check the received PSDU. If the PSDU is not decoded correctly (i.e. FCS is not passed), the STA will go to step (604) to increase the DBLost counter.

609. Otherwise if the PSDU is decoded correctly, the STA will process the type-2 beacon frame and then continue sensing the medium.

Figure 7:
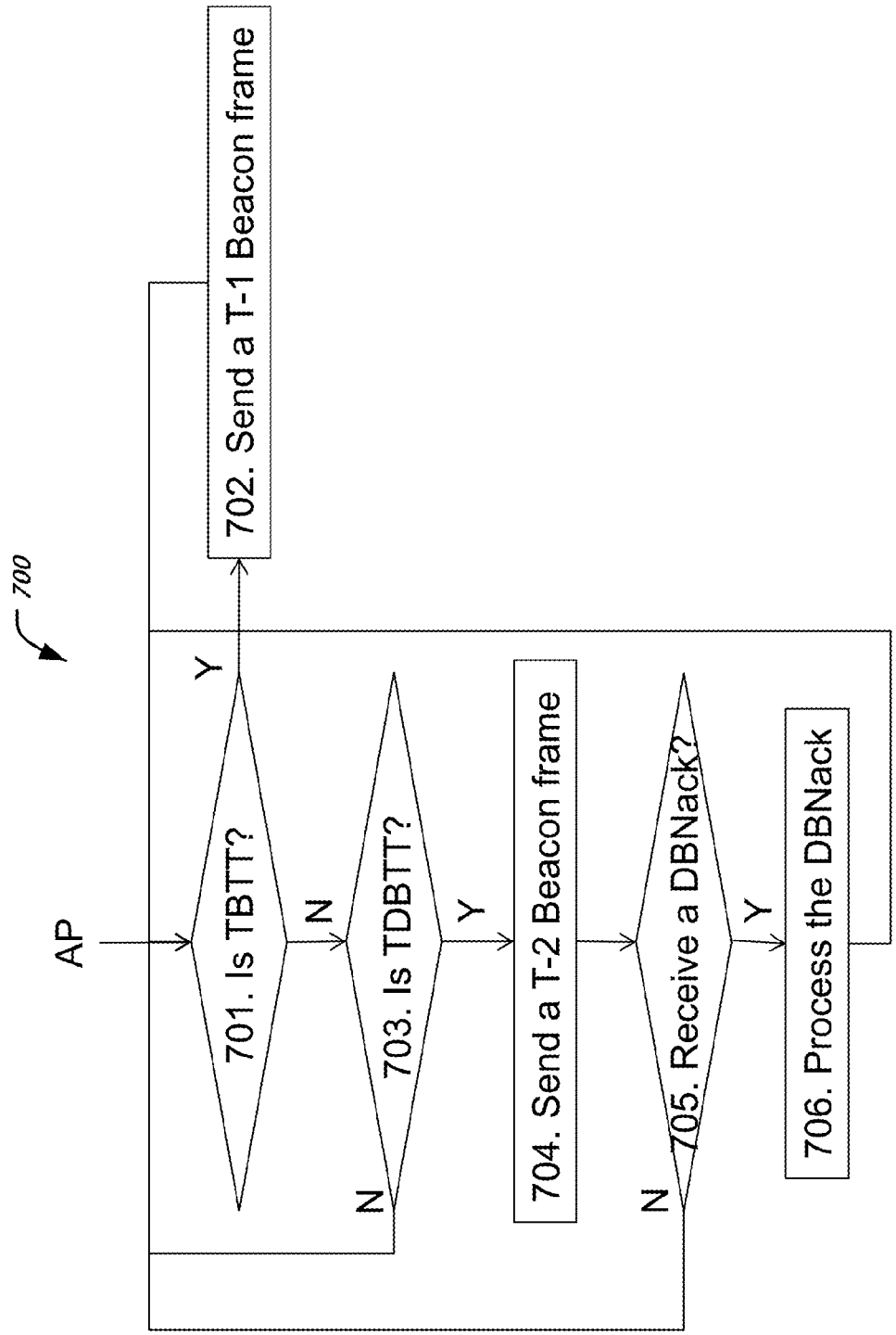
FIG. 7 shows an example of beacon frame transmission and DBNack frame process procedure.

FIG. 7 shows an example 700 of beacon transmission and DBNack processing procedure.

701: the DBEnabled AP checks whether it is the time of TBTT for type-1 beacon transmission.

702: If this is the time for type-1 beacon transmission, the DBEnabled AP sends a type-1 beacon frame over the air interface and continues operation.

703: Otherwise, the DBEnabled AP checks whether it is the time of TDBTT for type-2 beacon transmission.

704: If it is TDBTT for type-2 beacon transmission, the DBEnabled AP sends a type-2 beacon frame over the air interface, and then monitor the air interface.

705: If a DBNack is not received in SIFS time, the AP continues monitoring the air interface. If the DBEnabled AP receives a PPDU, it shall follow the existing procedure to process the packet. If the DBEnabled AP has data to send, it needs to contend the medium first and then transmit the data packet when the medium is acquired.

706: Otherwise, if the DBEnabled AP receives a DBNack, it processes the DBNack frame. If the number of received DBNack frames reaches a given threshold, the DBEnabled AP may need to take an appropriate action like reducing MCS rate, increasing the transmit power, or changing the starting time or period of type-2 beacon frame transmission so as to control and reduce missing BS frame detection.

In order to improve the winning probability of contending with other type of frames, this application discloses an approach of defining a new access category for beacon transmission only, called AC-BC, shown in Table 1.

TABLE 1

| Access Categories | | Contention Window Parameters | | |
|---|---|---|---|---|
| | | xSIFS | CWmin | CWmax |
| Control | ACK, DBNack, etc. | SIFS | NA | NA |
| Beacon | AC-BC | B-AIFS | B-CWmin | B-CWmax |
| Data and other management frames | AC-VO | AIFS | CWmin | CWmax |
| | AC-VI | AIFS | CWmin | CWmax |
| | AC-BE | AIFS | CWmin | CWmax |
| | AC-BG | AIFS | CWmin | CWmax |

With this special access category AC-BC dedicated to the beacon frame, the AP could set the AC-BC with higher priority than other management or data frames. Therefore the beacon frame will have higher priority over other types of frames during the medium contention so that the AP will wait a shorter period of time after sensing the medium idle and have the higher chance to acquire the transmission opportunity. After backoff a short random time specified by the AC-BC and still senses the medium idle, the AP will start transmitting a beacon frame.

As the new access category AC-BC is used for AP only, AP does not need to broadcast to STAs. However, APs in overlapping area might need to exchange this information to reduce the collision in beacon frame transmission via two approaches of exchanging AC-BC information:

(A) By using the over the air message to carry AC-BC information.

(B) By using the backhaul wired network to transmit the AC-BC parameters. In the approach, the Access Controller in ESS could help to distribute and synchronize AC-BC parameters amongst BSSs.

In addition, for the large cell size deployment, the type-2 beacon frame could be carried in the high efficiency (HE) PHY to improve the transmission robustness.

Figure 8:
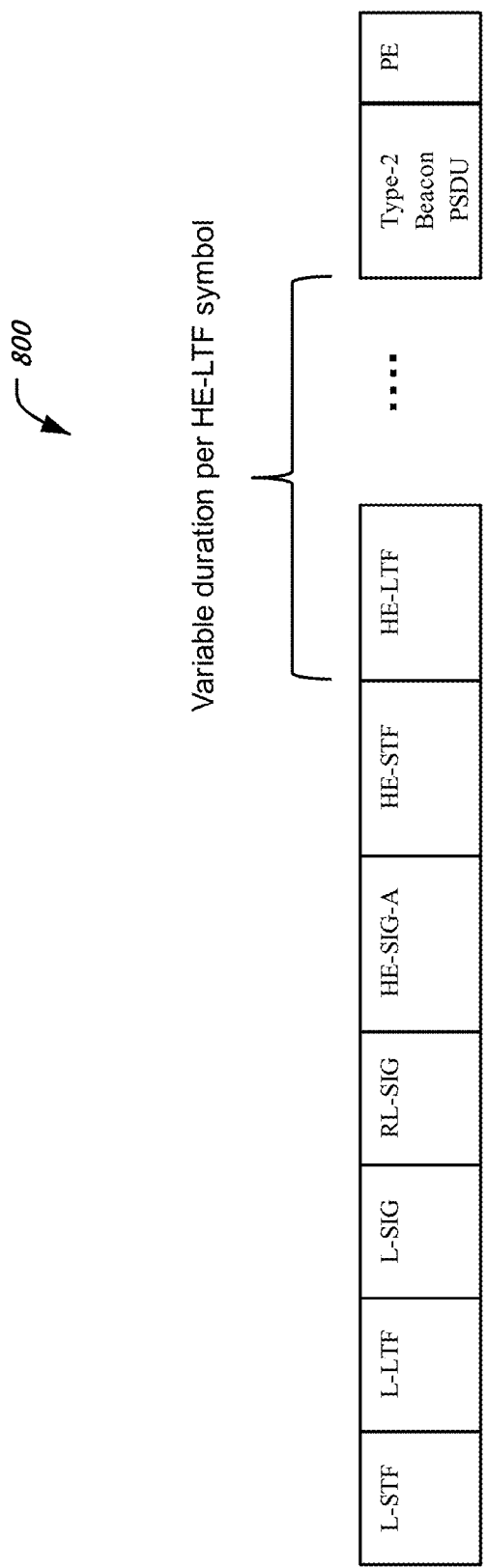
FIG. 8 shows an example PHY frame format.

FIG. 8 shows an example of a type-2 beacon transmission carried in HE PHY frame 800. All abbreviations have their customary meaning in the 802.11 specification. For example, L-STF is the short training field, L-LTF is the long training field, Type-2 physical layer service data unit (PSDU) and so on.

In the depicted embodiment, the HE PHY frame contains fields of legacy preamble, HE preamble, HE PSDU and Packet Extension (PE).

Legacy preamble: consists of L-STF, L-LTF, and L-SIG fields. In order to improve the transmission reliability and identify the new HE PHY frame, the repeated L-SIG field (i.e. RL-SIG) is added.

HE preamble: consists of HE-SIG-A, HE-STF, and HE-LTF. The HE-STF and HE-LTF are used to provide the reference signals for HE stations to perform the frequency and timing synchronization with the HE access point and radio environment measurement.

HE SIG-A: is the signal information field. It contains multiple subfields such as DL/UL indication, BSS Color Code, Spatial Reuse Information, TXOP duration, MCS rate, CP+LTF size, etc. The BSS Color Code provides a fast way for the receiver to identify BSS identifier at PHY layer.

HE PSDU: carries MAC payload, i.e. type-2 beacon frame.

The new HE PHY format is based on a OFDM numerology which uses 256 points of FFT in the 20 MHz channel bandwidth. Comparing to 64 points FFT in legacy IEEE802.11, the HE PHY could carry more subcarriers and have a longer OFDM symbol. This makes possible and feasible to have larger CP length of OFDM symbol. Based on different deployment situation, the CP+LTF field could be configured as follows to provide robustness of beacon signal transmission.

(a) 1× LTF+0.8 μs;
(b) 2× LTF+0.8 μs;
(c) 2× LTF+1.6 μs;
(d) 4× LTF+3.2 μs

Figure 9:
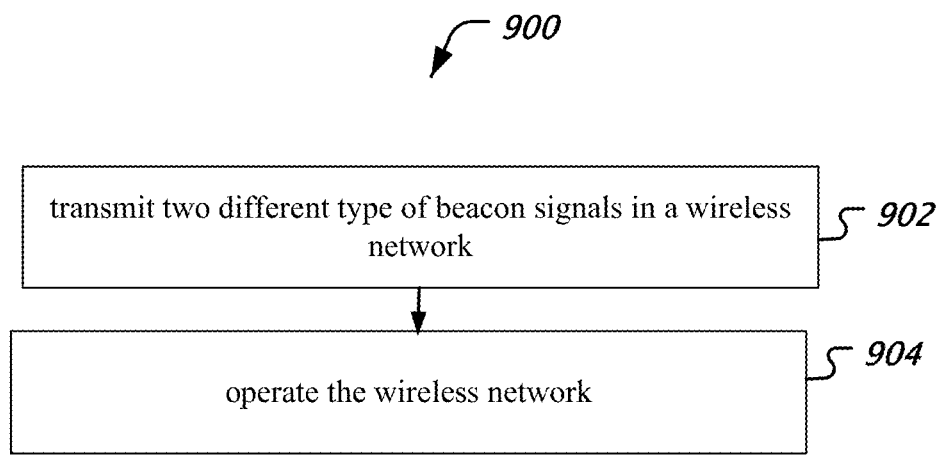
FIG. 9 shows an example method of wireless communication.

FIG. 9 shows an example flowchart of a method 900 of wireless communication. The method 900 may be implemented at an access point in a wireless network.

The method 900 includes, at 902, transmitting two different type of beacon signals in the wireless network. As described herein, the beacon transmissions may comprise at least two different beacon transmission types having different frame formats, transmissions of which are intermingled with each other. The first type of beacon transmissions comprise information about the wireless network that is not included in the second type of beacon transmissions.

The method 900 includes, at 904, operating the wireless network. For example, other wireless devices, e.g., STAs will be permitted to associate with the wireless network. The operation may include the formation of a BSS, operating in a OBSS, and so on.

In some embodiments, e.g., as depicted in FIG. 3, the first type of beacon transmissions are transmitted less frequently than the second type of beacon transmissions. In some embodiments, the first type of beacon transmissions are transmitted using a modulation efficiency that is less than that of the second type of beacon transmissions. In some embodiments, the first type of beacon transmissions include a complete set of information about the wireless network and the second type of beacon transmissions include partial information about the wireless network. In some embodiments, the information being sent on beacon transmissions may be determined at PHY layer. Such information may include, e.g., current network bandwidth utilization, errors occurring in beacon transmissions, reception of negative acknowledgements and so on. In some embodiments the information further includes a value indicative of whether the wireless communication device is operating in a basic service set or an overlapped basic service set.

In some embodiments, the method 900 further includes receiving a negative acknowledgement message indicating that a previous second type of beacon transmission was not received in the wireless network, and adjusting a periodicity of transmissions of the second type of beacon transmissions, using the negative acknowledgement message. For example, when too many Nacks are being received, a corrective step may be taken, e.g., increasing robustness by reducing modulation efficiency, changing the amount of error coding used, increasing the periodicity of transmission, increasing the transmission power, etc.

Figure 10:
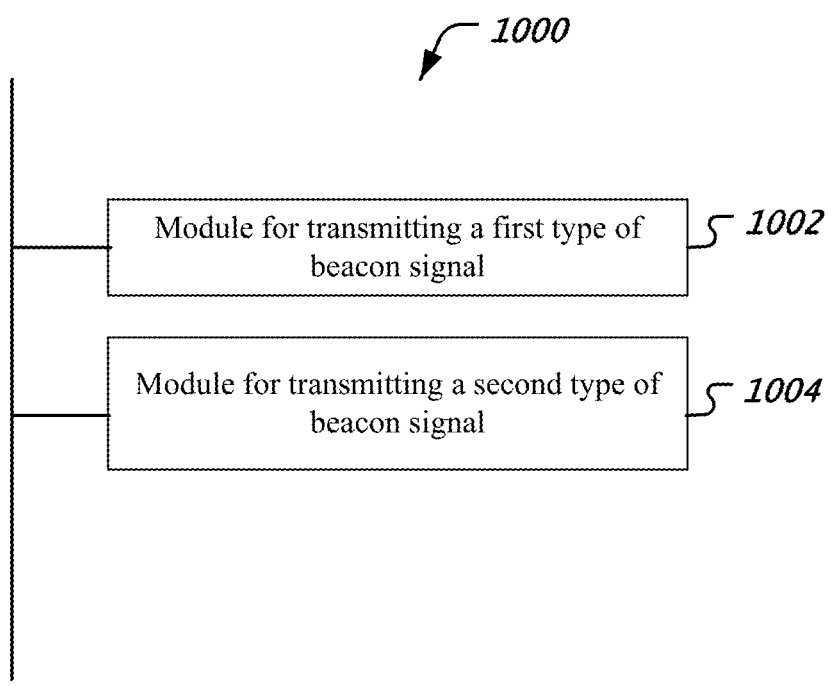
FIG. 10 shows an example of a wireless communication device.

FIG. 10 shows an example apparatus 1000 for wireless communication. The apparatus 1000 includes a module 1002 for transmitting a first type of beacon transmission, e.g., the type-1 beacon frames described herein. The module 1002 may include transmission processing such as signal amplification, filtering to fit within an allocated frequency band and radiation via one or more antenna. The apparatus 100 includes a module 1004 for transmitting a second type of beacon transmission, e.g., type-2 beacon frames described herein. The module 1004 may also include generating radio frequency spectrum of signal from the beacon frame by performing well understood techniques such as data modulation, filtering, power amplification and radio frequency conversion.

Figure 11:
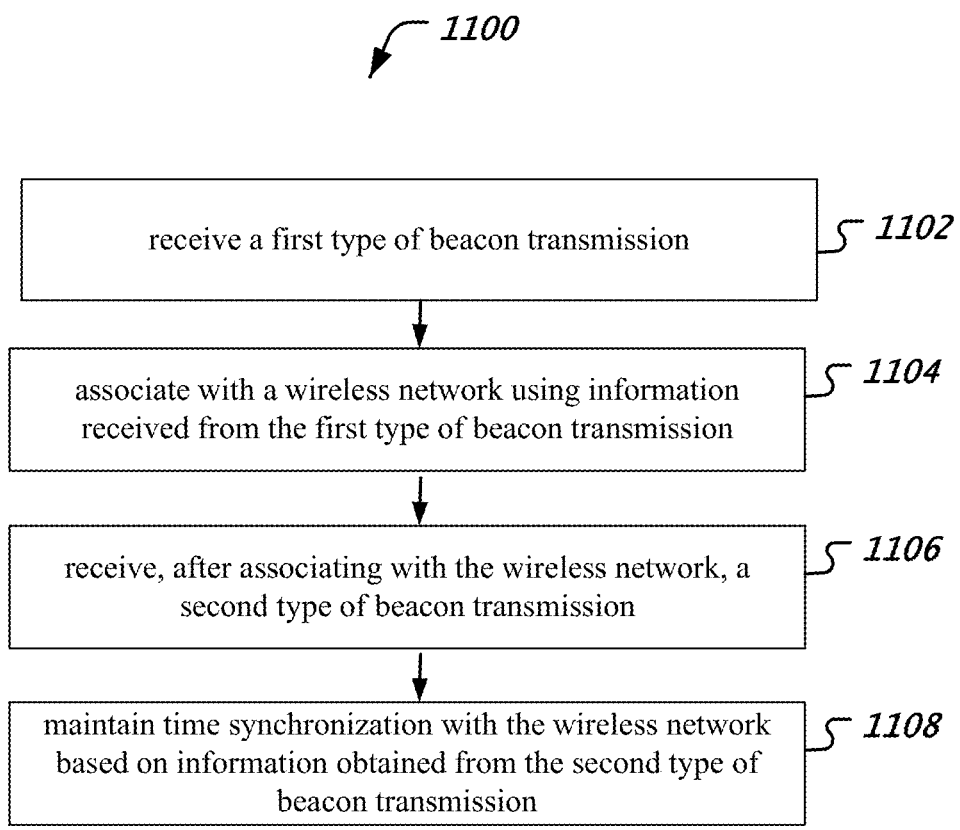
FIG. 11 shows an example method of wireless communication.

FIG. 11 shows an example flowchart of a method 1100 of wireless communication implemented at an STA in the wireless network.

The method 1100 includes, at 1102, receiving a first type of beacon transmission.

The method 1100 includes, at 1104, associating with a wireless network using information received from the first type of beacon transmission.

The method 1100 includes, at 1106, receiving, after associating with the wireless network, a second type of beacon transmission.

The method 1100 includes, at 1108, maintaining time synchronization with the wireless network based on information obtained from the second type of beacon transmission.

In some embodiments, the method 1100 further includes transmitting a negative acknowledgement message reporting a first error in reception of the second type of beacon transmission, but not for a second error in reception of the first type of beacon transmission. As described in some embodiments herein, the first type of beacon transmission occupies transmission medium for a duration longer than that for the second type of beacon transmission. In some embodiments, the first type of beacon transmission includes a complete set of information elements describing the wireless network and the second type of beacon transmission includes a partial set of information elements describing the wireless network.

Figure 12:
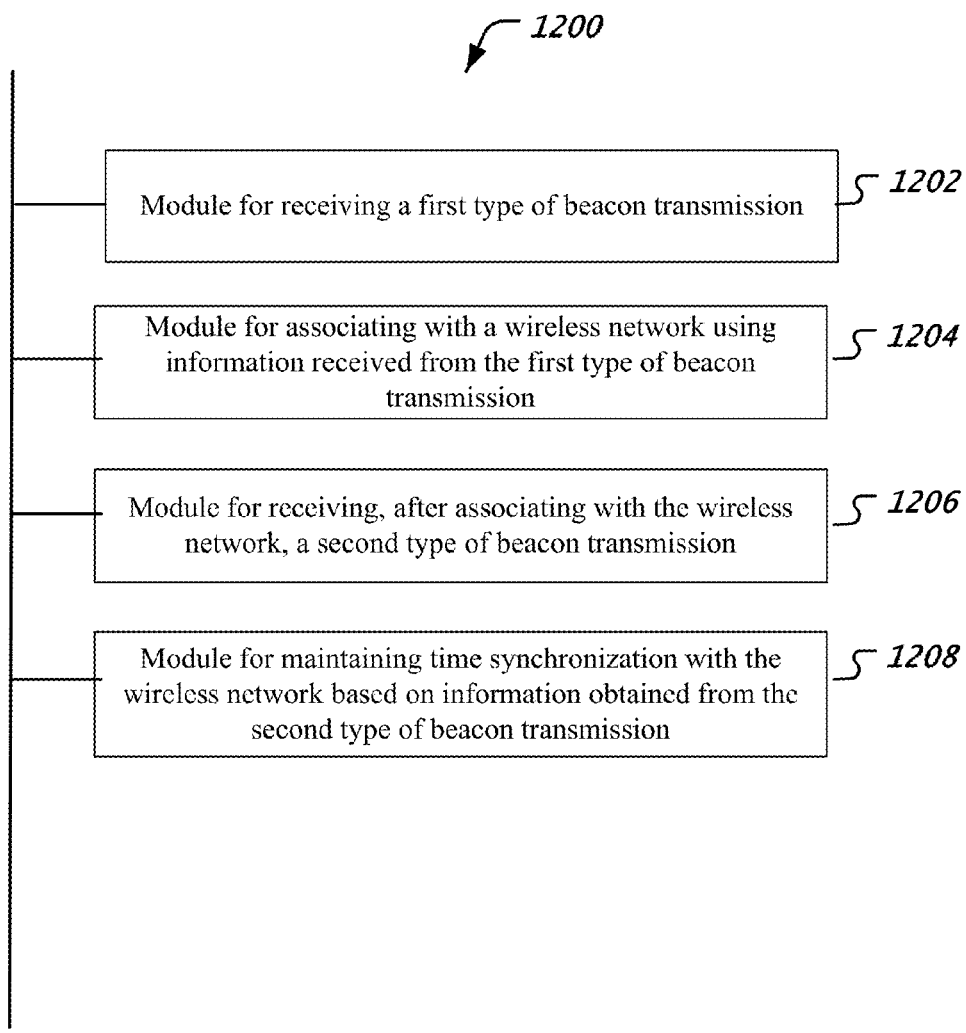
FIG. 12 shows an example wireless communication apparatus.

FIG. 12 depicts an example apparatus 1200 for wireless communication. The apparatus 1200 includes a module 1202 for receiving a first type of beacon transmission. The apparatus 1200 includes a module 1204 for associating with a wireless network using information received from the first type of beacon transmission. The apparatus 1200 includes a module 1206 for receiving, after associating with the wireless network, a second type of beacon transmission. The apparatus 1200 includes a module 1208 maintaining time synchronization with the wireless network based on information obtained from the second type of beacon transmission.

In some embodiments, a system for wireless communication includes an AP and at least one STA device as described herein.

It will be appreciated that techniques for using multiple beacon types in wireless communication have been disclosed. Using the disclosed technology, different beacon types are targeted towards different uses of beacon transmission—allowing new nodes to join, allowing currently admitted nodes to maintain synchronization, etc. The periodicity and modulation used for each of the multiple beacon transmissions could be adjusted independently of the others to meet operational conditions.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is what is described and illustrated, including:

1. A method of wireless communication, implemented at a wireless device in a wireless network, comprising:
    transmitting beacon signals that identify the wireless network and provide information for other wireless devices to associate or synchronize with the wireless network;
    wherein the beacon signals comprise at least two different beacon transmission types having different frame formats, transmissions of which are intermingled with each other, and
    wherein a first type of beacon transmissions comprise information about the wireless network that is not included in a second type of beacon transmissions;
    receiving a negative acknowledgement message indicating that a previous second type of beacon transmission was not received in the wireless network; and
    adjusting a PHY characteristic of the second type of beacon transmissions, using the negative acknowledgement message.

2. The method of claim 1, wherein the first type of beacon transmissions are transmitted less frequently than the second type of beacon transmissions.

3. The method of claim 1, wherein the first type of beacon transmissions are transmitted using a modulation efficiency that is less than that of the second type of beacon transmissions.

4. The method of claim 1, wherein the first type of beacon transmissions include a complete set of information about the wireless network and the second type of beacon transmissions include partial information about the wireless network.

5. The method of claim 1, further including:
    determining the information at a PHY layer of the wireless device.

6. The method of claim 1, wherein the information further includes a value indicative of whether the wireless communication device is operating in a basic service set or an overlapped basic service set.

7. A wireless communication device comprising a processor, a memory and a wireless interface, wherein the memory stores instructions that, when executed, cause the processor to:
- transmit beacon signals that identify the wireless network and provide information for other wireless devices to associate or synchronize with the wireless network;
- wherein the beacon signals comprise at least two different beacon transmission types having different frame formats, transmissions of which are intermingled with each other, and
- wherein a first type of beacon transmissions comprise information about the wireless network that is not included in a second type of beacon transmissions;
- receives a negative acknowledgement message indicating that a previous second type of beacon transmission was not received in the wireless network; and
- adjusts a PHY characteristic of the second type of beacon transmissions, using the negative acknowledgement message.

8. The wireless communication device of claim 7, wherein the first type of beacon transmissions are transmitted less frequently than the second type of beacon transmissions.

9. The wireless communication device of claim 7, wherein the first type of beacon transmissions are transmitted using a modulation efficiency that is less than that of the second type of beacon transmissions.

10. The wireless communication device of claim 7, wherein the first type of beacon transmissions include a complete set of information about the wireless network and the second type of beacon transmissions include partial information about the wireless network.

11. The wireless communication device of claim 7, wherein the processor further controls a circuit to determine the information at a PHY layer of the wireless device.

12. The wireless communication device of claim 7, wherein the information further includes a value indicative of whether the wireless communication device is operating in a basic service set or an overlapped basic service set.

13. A method of operating a wireless device, comprising:
- receiving a first type of beacon transmission;
- associating with a wireless network using information received from the first type of beacon transmission;
- receiving, after associating with the wireless network, a second type of beacon transmission; and
- maintaining time synchronization with the wireless network based on information obtained from the second type of beacon transmission;
- transmitting a negative acknowledgement message reporting a first error in reception of the second type of beacon transmission, but not for a second error in reception of the first type of beacon transmission.

14. The method of claim 13, wherein the first type of beacon transmission occupies transmission medium for a duration longer than that for the second type of beacon transmission.

15. The method of claim 13, wherein the first type of beacon transmission includes a complete set of information elements describing the wireless network and the second type of beacon transmission includes a partial set of information elements describing the wireless network.

16. An apparatus comprising a processor, a memory and a wireless interface, wherein the processor reads instructions from the memory, the instructions comprising:
- instructions for receiving a first type of beacon transmission;
- instructions for associating with a wireless network using information received from the first type of beacon transmission;
- instructions for receiving, after associating with the wireless network, a second type of beacon transmission; and
- instructions for maintaining time synchronization with the wireless network based on information obtained from the second type of beacon transmission;
- instructions for transmitting a negative acknowledgement message reporting a first error in reception of the second type of beacon transmission, but not for a second error in reception of the first type of beacon transmission.

17. The apparatus of claim 16, wherein the first type of beacon transmission occupies transmission medium for a duration longer than that for the second type of beacon transmission.

18. The apparatus of claim 16, wherein the first type of beacon transmission includes a complete set of information elements describing the wireless network and the second type of beacon transmission includes a partial set of information elements describing the wireless network.

* * * * *